United States Patent [19]

Suzuki

[11] Patent Number: 4,829,843
[45] Date of Patent: May 16, 1989

[54] APPARATUS FOR ROCKING A CRANK
[75] Inventor: Yuichi Suzuki, Yokohama, Japan
[73] Assignee: The Furukawa Electric Co., Ltd., Tokyo, Japan
[21] Appl. No.: 48,715
[22] Filed: May 12, 1987

Related U.S. Application Data

[63] Continuation-in-part of Ser. No. 646,333, Aug. 31, 1984, abandoned.
[51] Int. Cl.⁴ .................. G05G 1/00; H01H 61/06; H01H 71/18
[52] U.S. Cl. ........................... 74/470; 74/519; 337/140; 60/527
[58] Field of Search ............... 74/470, 519; 337/140, 337/141, 139, 333; 60/527; 185/37; 236/91 R

[56] References Cited

U.S. PATENT DOCUMENTS

| | | | |
|---|---|---|---|
| 1,215,665 | 2/1917 | Landis | 337/140 |
| 2,333,125 | 11/1943 | Schmidinger | 337/140 |
| 3,180,954 | 4/1965 | Collette et al. | 337/140 |
| 3,594,674 | 7/1971 | Willson | 337/140 |
| 3,634,803 | 1/1972 | Willson | 337/140 |
| 3,703,693 | 11/1972 | Levinn | 60/527 |
| 3,922,591 | 11/1975 | Olsen | 337/140 |
| 3,967,227 | 6/1976 | Clarke et al. | 337/140 |
| 4,205,293 | 5/1980 | Melton et al. | 337/139 |
| 4,275,370 | 6/1981 | Sims | 337/140 |
| 4,281,513 | 8/1981 | Johnson et al. | 60/527 |

FOREIGN PATENT DOCUMENTS 49871  4/1919  Sweden ............... 337/140

Primary Examiner—Richard E. Moore
Assistant Examiner—Vinh Luong
Attorney, Agent, or Firm—Armstrong, Nikaido, Marmelstein, Kubovcik & Murray

[57] ABSTRACT

An apparatus for rocking a crank has a crank having opposite ends and being pivotally mounted at one end thereof to a first point on a first substrate, a first spring attached at one end thereof to a second point on a second substrate and at the other end thereof to the other end of the crank and a second spring attached at one end thereof to a third point on a third substrate and at the other end thereof to the other end of the crank, an angle defined between a line extending through the first and second points and a line extending through the first and third points, respectively, on a side opposite an arc through which said other end of the crank moves being in a range of 105° to 160° and the first spring or both first spring and second springs being made of shape memory alloy(s) which returns(s) to a predetermined shape upon application of heat whereby the crank is rocked back and forth by temperature variations.

1 Claim, 5 Drawing Sheets

APPARATUS FOR ROCKING A CRANK

This application is a continuation-in-part application of Ser. No. 646,333, filed 8/31/84, now abandoned.

BACKGROUND OF THE INVENTION

The present invention relates to an apparatus for rocking a crank used both coil spring made of the shape memory alloy and bias coil spring or coil spring made of the shape memory alloy, which functions particularly to increase the rocking stroke of the crank and/or the rotational angle of the crank axis.

The shape memory alloy is one which shows an unique characteristic called the shape memory effect, that is, when the alloy is made to memorize a definite shape at a high temperature and then deformed at a temperature below the transformation temperature, it recovers the memorized shape on heating above the transformation temperature, and the alloys of the types of Ni-Ti, Cu-Zn-Al, Au-Cd and the like are known. The phenomenon called the shape memory effect is an irreversible phenomenon ordinarily. Although the alloy recovers the memorized shape on heating after deformed at a low temperature, it does not rerecover the shape deformed at the low temperature, even if cooled it to the low temperature again. In order to utilize this phenomenon industrially, it is necessary to make the alloy function reversible that enables repetitive action, and various methods have been proposed. Among these methods, a method by means of bias force has the advantages that the design of the device is easy, that not large amount of the shape memory alloy material are needed, etc., and a method by means of differential motion has the advantages that the generating force is strong, that the control of the generating force is easy, etc. Therefore, both methods are used widely.

The method by means of bias force or differential motion utilizes the characteristics that the shape memory alloy is soft and the yield stress is small at a low temperature, that is, a temperature lower than that of the shape being recovered by heating (this is called Af point), while it is hard and the yield stress is large at a high temperature above the Af point. for example, as shown in FIG. 1, an apparatus is known, wherein a rod (3) is made to be pulled to and fro by placing coil spring made of the shape memory alloy (1) (hereinafter abbreviated to as F spring) and bias coil spring or coil spring made of the shape memory alloy (2) (hereinafter abbreviated to as B spring) under a state of pulling deformation appropriately. In the case of the method by means of bias force using bias coil spring as described above, the shape memory alloy is soft at a temperature below the Af point. Therefore, the F spring (1) is pulled and extended by the B spring (2) and the rod (3) occupies a position at the side of B spring (2). When the temperature is raised to a temperature above the Af point by heating through the irradiation with infrared rays, the conduction of electric current and the like, the F spring (1) becomes hard and strong as well as it recovers the memorized shape. Therefore, the rod (3) is pulled by F spring (1) to move to the side of F spring (1). When the temperature of the F spring (1) is lowered again to a temperature below the Af point, the F spring (1) becomes soft and the rod (3) moves to the side of B spring (2) as a result of the pulling by B spring (2). Therefore, the rod (3) becomes to be subjected to the reciprocative movement through the shape change due to the temperature variation, and this is utilized to various actuators.

On the other hand, in the case of the method by means of differential motion using coil spring made of the shape memory alloy (B spring) as described above, if the temperature of the B spring (2) is raised to a temperature above the Af point by heating through the irradiation with infrared rays, the conduction of electric current and the like under a state that the ambient temperature is lower than the Af point, the B spring (2) becomes hard and strong as well as it recovers the shape, while the F spring (1) is soft remaining at a temperature below the Af point. Therefore, the F spring (1) is pulled and extended by B spring (2) and the rod (3) moves to the side of B spring (2). When stopped the heating of the B spring (2) and heated the F spring (1), the F spring (1) becomes hard and strong as well as it recovers the shape this time and pulls the B spring (2). While the B spring (2) which is not heated becomes soft remaining at a temperature below the Af point and is pulled by F spring (1). As a result, the rod (3) moves to the side of F spring (1). Therefore, the rod (3) becomes to be subjected to the reciprocative movement through the shape change due to the temperature variation of both springs of F (1) and B (2), and this is utilized similarly to various actuators.

However, with the structure as this, when the F spring contracts from the extended state through the shape recovery, the shape recovery force is decreased gradually as the contraction of the F spring proceeds, while the spring force of the B spring is increased gradually as the B spring is pulled and extended. As a result, the generating force which is a difference between the forces of both springs is to be decreased rapidly with an increase of the rod movement (stroke). In order to increase the stroke and the generating force, it is necessary to decrease the stroke dependence of the force of the B spring and the shape recovery force of the F spring. For the attainment of this, both springs become long, and there have been the problems in the points of the size of the apparatus, price, etc.

In order to dissolve this, such one is known as contrived in a manner that the spring force of the B spring is not increased but decreased adversely on the contraction of the F spring through the shape recovery by utilizing the crank mechanism and making the B spring have a negative spring force dependence apparently. For example, in the disclosure of Japanse Unexamined Patent Publication No. 7683/1974, the moment brought by the B spring is arranged to have a negative position dependence constantly. Since the moment is a product of the distance with the force, if the variation of the distance is large enough compared with that of the force and has a negative dependence, the negative position dependence can be obtained as a whole moment to compensate for a positive position dependence of the shape recovery force of shape memory alloy. However, as shown in FIG. 2(A), in order to make the moment brought by the B spring exhibit a negative variation against the position of the crank (4) and generate an effective force, the range of the angle is extremely narrow as shown by A in FIG. 2(B), and it has been impossible to make the stroke long.

As a result of various investigations in view of this, an apparatus for rocking the crank has been developed leading to the invention, which has made it possible to obtain a strong generating force in a wide position ranging by improving the crank mechanism, and by making the position dependence of the moment brough by the B spring negative within the position range where the moment brought by the F spring has a positive dependence against the position and the position dependence of the moment of B spring positive within the position range where the moment of F spring has a negative position dependence.

SUMMARY OF INVENTION

The rocking apparatus of the invention comprises a crank having opposite ends and being pivotally mounted at one end thereof to a first point on a substrate, a first spring (F spring) attached at one end thereof to a second point on the substrate and at the other end thereof to the other end of the crank and a second spring (B spring) attached to one end thereof to a third point on the substrate and at the other end thereof to the other end of the crank. An angle defined by lines extending through said first and second points and said first and third points, respectively, on a side opposite an arc through which said other end of the crank moves is in a range of 105° to 160°, preferably 120° to 160°, and said first spring or both first spring and second spring is (are) made of shape memory alloy(s) which return(s) to a predetermined shape upon application of heat whereby said crank is rocked back and forth by temperature variations.

DETAILED DESCRIPTION OF THE INVENTION

Figure 3:
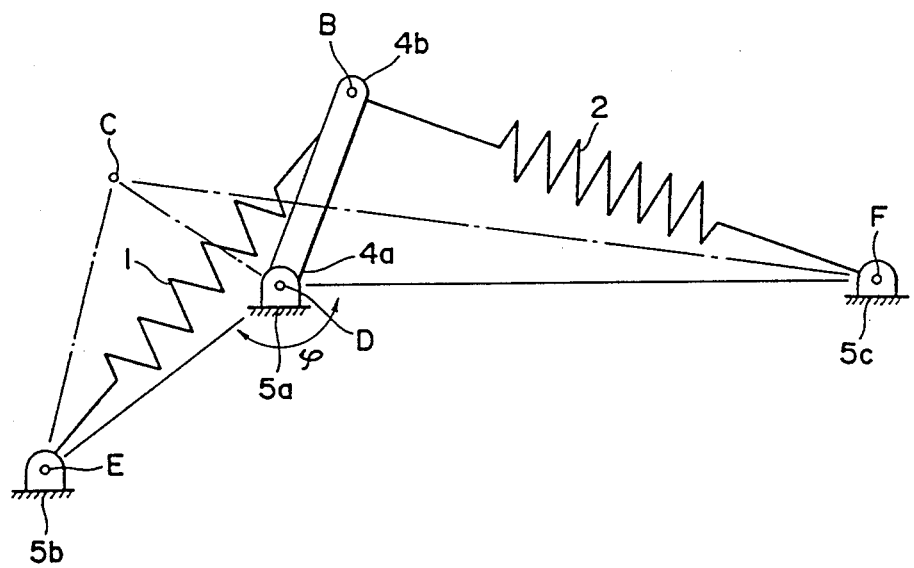
FIG. 3 is a principle diagram representing one example of the apparatus of the invention.

FIG. 3 is a principle diagram representing one example of the apparatus of the invention. In the diagram, (1) indicates F spring, (2) indicates B spring, (4) indicates crank, and (5a), (5b) and (5c) indicates the substrates. The crank (4) is pivoted to the substrate (5a) at its one end (4a) so as to rock freely, and connected to the substrate (5b) at its rocking end (4b) through the F spring (1) fitted to one side of the rocking directions, while it is also connected to the substrate (5c) through the B spring (2) fitted to the other side of the rocking directions. Thus, the rocking end (4b) of the crank (4) is kept in a state pulled together by F spring (1) and the B spring (2). Now, in the case of the B spring being bias coil spring, when the temperature of the F spring (1) is below the Af point, in such state, the rocking end (4b) of the crank (4) occupies a position B near the B spring (2) side as shown in the diagram, since the force of the F spring (1) is weak and overcome by the force of the B spring (2). When the temperature of the F spring (1) becomes above the Af point by heating, the rocking end (4b) of the crank (4) moves to a position C shown in the diagram, since the F spring (1) becomes strong and pulls the B spring (2): When the temperature of the F spring (1) is lowered below the Af point, the rocking end (4b) of the crank (4) returns to the position B again. Besides, the heating of the F spring (1) is not shown in the diagram, which may be carried out by publicly known means such as the conduction of electric current, the irradiation with infrared rays or the like. In the apparatus as this, the pivot point (D) and the link points (E), (F) of both springs (1), (2) have been established at such positions as the angle φ on the opposite side of the crank (4) formed by the straight line DE connecting the pivot point (D) of the crank (4) and the link point E of the F spring (1) and the straight line DF connecting the pivot point (D) and the link point (F) of the B spring (2) is 105° to 160°, preferably 120° to 160°. By establishing the pivot point (D) and both link points (E), (F) at such positions, it has been attained that, when the F spring (1) recovers the shape by heating to a temperature above the Af point and the generating moment is increased against the variation of the rocking angle of crank (4), that is, within a range where the moment by the F spring (1) has a positive dependence, the moment by the B spring (2) has a negative dependence adversely against the rocking angle, and within a range where the moment of the F spring (1) exhibits a negative variation against the rocking angle as a result of the increase in the rocking angle [contraction of the F spring (1)], the moment by the B spring (2) has a positive dependence.

In the case of the B spring being coil spring made of the shape memory alloy, when the temperature of the F spring (1) is below the Af point and that of the B spring (2) is above the Af point, in such state, the rocking end (4b) of the crank (4) is pulled to the B spring (2) side and moves to a position C as shown in the diagram, since the force of the F spring (1) is weak and overcome by the force of the B spring (2). On the contrary, if the temperature of the B spring (2) is below the Af point and that of the F spring (1) becomes above the Af point by heating, the rocking end (4b) of the crank (4) moves to a position B shown in the diagram, since the F spring (1) becomes strong and pulls the B spring (2). Besides, the heating of the F spring (1) is not shown in the diagram, which may be carried out by publicly known means such as the conduction of electric current, irradiation with infrared rays, supply of hot air, supply of hot or cold water, use of heater or environmental temperature or the like. In the apparatus as this, the pivot point (D) and the link points (E), (F) of both springs (1), (2) have been established at such positions as the angle φ mentioned above is similarly 105° to 160°, preferably 120° to 160°. By establishing the pivot point (D) and both link points (E), (F) at such positions, it has been attained that, when the F spring (1) recovers the shape by heating to a temperature above the Af point and the generating moment is increased against the variation of the rocking angle of crank (4), that is, within a range where the moment by the F spring (1) has a positive dependence, the moment by the B spring (2) has a negative dependence adversely against the rocking angle, and within a range where the moment of the F spring (1) exhibits a negative variation against the rocking angle as a result of the increase in the rocking angle [contraction of the F spring (1)], the moment by the B spring (2) has a positive dependence.

Figure 1:
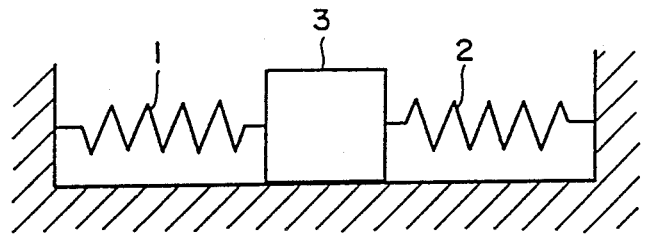
FIG. 1 is a principle diagram showing one example of the typical apparatus for moving the rod.
Figure 2A:
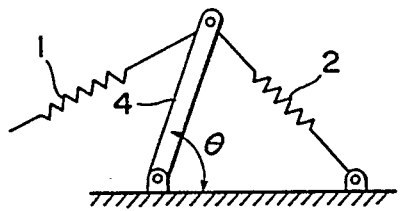
FIGS. 2(A) and (B) indicate the angle dependence of the moment generated by the B spring in the conventional apparatus for rocking the crank, thereby (A) is a schematic diagram and (B) is an illustrating diagram showing the angle dependence of the moment.
Figure 2B:
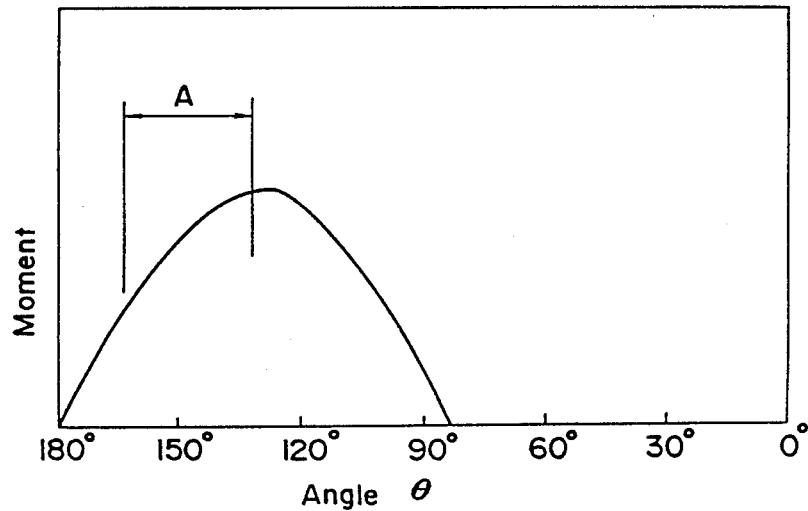

By adopting the aforementioned constitution, the apparatus of the invention has made it possible to put not only the range (A) where the moment of the B spring has a negative dependence against the rocking angle of the crank as shown in FIG. 2 which has been known so far, but also the range where the moment of the B spring has a positive dependence into an effective action region, and to increase the rocking stroke of the crank and/or the rotational angle of the crank axis to an extent more than about twice compared with those of the conventional one.

Explanation will be made further showing concrete numerical values. The spring constant of the shape memory alloy spring varys generally according to the environmental temperature. with this spring, for example, the spring constant at high temperature ($h_H$) is 0.014 kgf/mm, while that at low temperature ($h_L$) is 0.0043 kgf/mm. These values correspond to the shear modulus at high temperature ($G_H$) of 2050 kgf/mm$^2$ and that at low temperature ($G_L$) of 630 kgf/mm$^2$, respectively.

Figure 4:
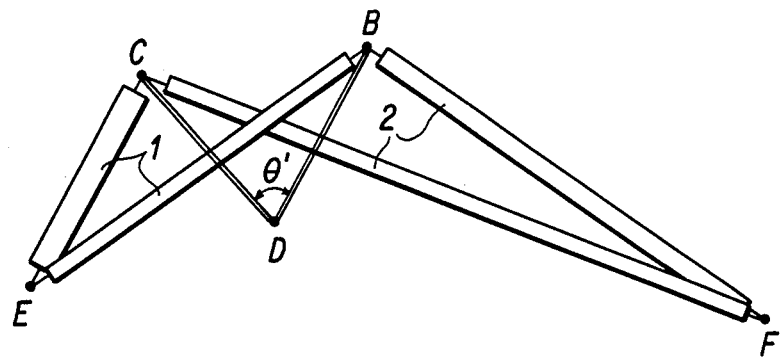
FIG. 4 is an illustrating diagram showing the extension and contraction of shape memory alloy coil and bias spring.

In an example of FIG. 4 wherein a shape memory alloy coil (1) and a bias spring (2) are used as the F spring and the B spring, $h_H$ and $h_L$ of the shape memory alloy coil (1) are 0.0277 kgf/mm and 0.0085 kgf/mm, respectively, and the spring constant of the bias spring (2) h is 0.0121 kgf/mm. The sizes of the coil (1) are 10.5 mm in coil diameter, 0.75 mm in wire diameter and 10.6 mm in length, and number of turns is five. Such shape memory alloy coil (1) extends to a length of 20 mm at high temperature and 35 mm at low temperature from the original length tereof. On the other hand, the bias spring (2) with an original length of 25 mm extends to 56 mm at high temperature according to the force balance with shape memory alloy coil (1). At low temperature, the bias spring (2) recovers the length thereof to 40 mm. B and C show the positions at low temperature and at high temperature and a deflection angle of crank of 75° is available as a result.

The rotational moment to be generaled by the B spring should exist between the rotational moments to be generated by the F spring at high temperature and at low temperature. Here, the high temperature is a temperature below Af+50° C. and the low temperature above Af−50° C. Af is a temperature at which the shape is recovered by heating as defined previously.

In practice, the temperature range is set forth within a range between 70° C. and −20° C. If the temperature is higher than 70° C., the fatigue life of the alloy would be reduced, and, if lower than −20° C., the fabrication of the alloy and coil spring would become difficult. Example in FIG. 4 has a reaction temperature of 37° C.

With regard to the thermal coefficient of heat transfer of shape memory Ni-Ti alloys, it is almost same as the value of stainless steel. However, in the actual use, such coefficient can be neglected because the coefficient of air is far lower than that of alloy and the heat transfer is determined by the environmental air.

In following, the effect of the invention will be illustrated in more detail using examples.

EXAMPLE 1

Figure 5A:
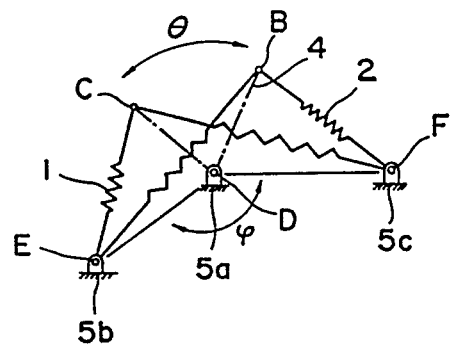
FIGS. 5(A) and (B) indicate the characteristic of the apparatus of the invention, thereby (A) is a schematic diagram of the apparatus of the invention and (B) is an illustrating diagram of the characteristic of the apparatus of the invention.

Employing a coil spring made of the shape memory alloy (F spring) which was prepared by forming a shape memory alloy wire of the type of Ni-Ti with a diameter of 0.75 mm into a closely wound coil spring with a mean diameter of 5.0 mm and an effective number of turns of 20 and by submitting it to heat treatment for 30 minutes at a temperature of 450° C. under a fixed state, a bias coil spring (B spring) made of stainless steel, which has a spring constant of 0.003 kgf/mm, and a crank with a length of 15 mm, as shown in FIG. 5(A), one end of the crank (4) was pivoted to the substrate (5a) so as to rock freely, the rocking end of the crank (4) was connected to the substrate (5b) through the F spring (1) fitted to one side of the rocking directions, and it was also connected to the substrate (5c) through the B spring (2) fitted to the other side of the rocking directions to constitute the apparatus for rocking the crank. Using this apparatus, the pivot point (D) and both link points (E), (F) were established varying the angle $\phi$ on the opposite side of the crank (4) formed by the straight line DE connecting the pivot point (D) of the crank and the link point (E) of the F spring (1) and the straight line DF connecting the pivot point (D) and the link point (F) of the B spring (2), the F spring (1) was heated through the conduction of electric current, and the variable angle $\theta'$ of the crank capable of acting reversibly was measured between (B) and (C). Results are shown in FIG. 5(B).

Figure 5B:
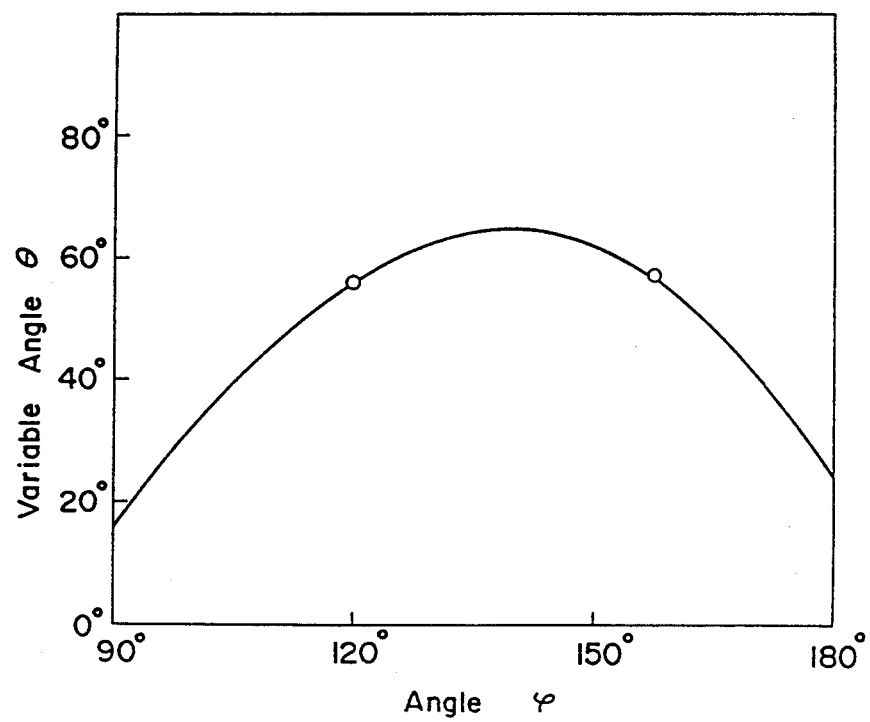

As can be seen from FIG. 5(B), the variable angle amounting to about twice compared with that of the conventional apparatus is obtained at an angle $\phi$ of 105° to 160° which is formed between the pivot point and both link points. In particular, excellent results are obtained within a range of 120° to 160°. Namely, by keeping $\phi$ between 105° and 160°, aforementioned characteristic does not change so much and excellent action characteristic can be obtained, even if the length of the crank and the distance between the pivot point of the crank and the link points of both springs are allowed to change, or the initial tension of the B spring is allowed to change within an utility limit (from zero to 10 times of the spring constant).

EXAMPLE 2

Employing two coil springs made of the shape memory alloy (F spring and B spring) which were prepared by forming a shape memory alloy wire of the type of Ni-Ti with a diameter of 0.75 mm into closely wound coil springs each with a mean diameter of 5.0 mm and an effective number of turns of 20 and by submitting them to heat treatment for 30 minutes at a temperature of 450° C. under a fixed state, and a crank with a length of 15 mm, as shown in FIG. 5(A), one end of the crank (4) was pivoted to the substrate (5a) so as to rock freely, the rocking end of the crank (4) was connected to the substrate (5b) through the F spring (1) fitted to one side of the rocking directions, and it was also connected to the substrate (5c) through the B spring (2) fitted to the other side of the rocking directions to constitute the apparatus for rocking the crank. Using this apparatus, the pivot point (D) and both link points (E), (F) were established varying the angle $\phi$ on the opposite side of the crank (4) formed by the straight line DE connecting the pivot point (D) of the crank and the link point (E) of the F spring (1) and the straight line DF connecting the pivot point (D) and the link point (F) of the B spring (2), both the F spring (1) and the B spring (2) were heated alternately through the conduction of electric current, and the variable angle θ' of the crank capable of acting reversibly was measured between (B) and (C). Similar results were obtained as in Example 1.

As described above, according to the invention, special parts are not needed, and only by establishing the positions of the pivot point of crank and the link points of both springs in a specific relation, there is excellent improvements in the variable angle θ', that is, in the rocking stroke of the crank and/or the rotational angle of the crank axis. Therefore, the invention can be applied to sensor, actuator and combined use of the sensor and the actuator element such as various actuators, thermal sensors, safety devices and the like with a remarkable effectiveness.

Figure 6:
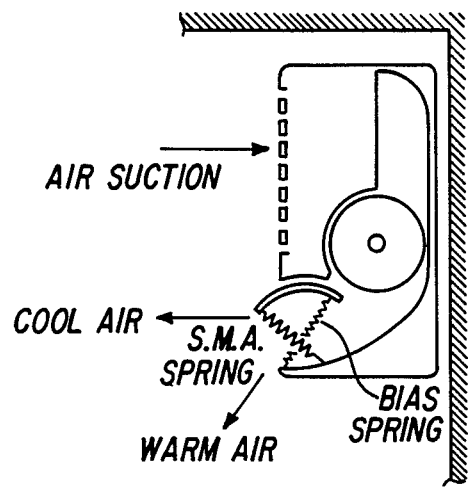
FIG. 6 shows an air conditioner which is a typical embodiment of the invention.
Figure 7A:
FIGS. 7(A) and (B) are actual views of shape memory alloy spring and bias spring.
Figure 7B:
Figure 8A:
FIGS. 8(A) through (D) are parts used for the conventional system, thereby (A) is a thermistor, (B) is an integral circuit, (C) is a relay and (D) is a motor.
Figure 8C:
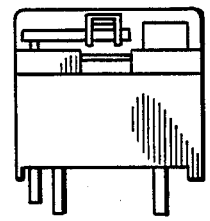
Figure 8B:
Figure 8D:
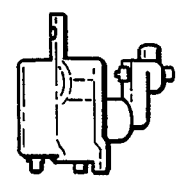

FIG. 6 shows an air conditioner for heating and cooling air as one of such commercial applications of the invention. When air is heated, the shape memory alloy spring shrinks to lower the flaps. By contrast, while the conditioner is used for cooling, the flaps are directed in horizontal position under the action of bias spring to blow air upward. The advantages over the conventional system, some parts therefor being shown in FIG. 8, are small temperature hysteresis that means higher response performance, fewer number of parts allowing smaller and more lightweight design with less troubles and energy saving because of no electric motor. FIGS. 7(A) and (B) are actual views of shape memory alloy spring and bias spring usable for the air conditioner.

What is claimed is:

1. An apparatus for rocking a crank, comprising:
   a crank having opposite ends and being pivotally mounted at one end thereof to a first point on a first substrate;
   a first spring attached at one end thereof to a second point on a second substrate and at the other end thereof to the other end of the crank; and
   a second spring attached at one end thereof to a third point on a third substrate and at the other end thereof to the other end of the crank, an angle defined between lines extending through said first and second points and said first and third points, respectively, on a side opposite an arc through which said other end of the crank moves, being in a range of 120° to 160° and said first spring being made of a shape memory alloy which returns to a predetermined shape upon application of heat whereby said crank is rocked back and forth by temperature variations, and wherein said second spring is made of shape memory alloy which returns to a predetermined shape upon application of heat, and further wherein a rotational moment generated by said first spring at high temperature and at low temperature, wherein said high temperature is a temperature below Af +50° C. and said low temperature is above Af −50° C., wherein Af is a temperature at which shape is recovered by heating.

* * * * *